(12) United States Patent  (10) Patent No.: US 8,723,861 B1
Strater et al.  (45) Date of Patent: May 13, 2014

(54) PROGRESSIVE SHELL OPERATIONS

(75) Inventors: Jeffrey T. Strater, Portland, OR (US); Paul R. Lebovitz, Portland, OR (US); Gautham Sudhakar Kattethota, Commerce, MI (US)

(73) Assignee: Autodesk, Inc., San Rafael, CA (US)

( * ) Notice: Subject to any disclaimer, the term of this patent is extended or adjusted under 35 U.S.C. 154(b) by 1280 days.

(21) Appl. No.: 12/537,946

(22) Filed: Aug. 7, 2009

(51) Int. Cl.
 *G06T 15/00* (2011.01)
(52) U.S. Cl.
 USPC ........... 345/419; 345/420; 345/421; 345/620; 345/629
(58) Field of Classification Search
 None
 See application file for complete search history.

(56) References Cited

U.S. PATENT DOCUMENTS

| 7,031,790 | B2 | 4/2006 | Hill |
| 7,155,375 | B1 * | 12/2006 | Rimoldi et al. ................... 703/2 |
| 7,567,249 | B2 * | 7/2009 | Hashima et al. .............. 345/428 |
| 7,724,252 | B2 * | 5/2010 | Mazzanti ...................... 345/419 |
| 2001/0043236 | A1 * | 11/2001 | Yamamoto ................... 345/781 |
| 2012/0236028 | A1 * | 9/2012 | Desimone et al. ............ 345/630 |

* cited by examiner

*Primary Examiner* — James A Thompson
*Assistant Examiner* — David H Chu
(74) *Attorney, Agent, or Firm* — Fish & Richardson P.C.

(57) ABSTRACT

Techniques for forming a complex shelled object are described. The shelling procedure does not merely combine two shelled objects into in single shelled object, but also integrates the two object with one another without destroying the integrity of either of the shelled objects.

21 Claims, 19 Drawing Sheets

PROGRESSIVE SHELL OPERATIONS

TECHNICAL FIELD

This invention relates to computer aided design.

BACKGROUND

Computer aided design (CAD) drawing tools can be used by a designer to form complex structures that are subsequently turned in physical structures, such as by molding an object out of metal or a resin. Often, in forming complex structures, the structure is created by adding a new section onto a previously created form. For example, the new section can be simply adjoined to an existing form.

SUMMARY

In one aspect, a computer implemented method of forming a representation of a shelled object is described. The method includes receiving a tool body to be added onto a base body and determining one or more surfaces of the tool body that are not shared with the base body. A form with offset features is created, wherein the creating step includes either offsetting the tool body away from the surfaces that are not shared with the base body and toward the base body or offsetting the surfaces of the tool body that are not shared with the base body toward the base body. The form with offset features is divided into a plurality of cells. A subset of cells from the plurality of cells is joined to form an assembly, wherein a representation of the assembly is shown on a display of a graphical computing device.

Embodiments of the method can include one or more of the following features. Determining can include classifying the surfaces of the tool body as surfaces that are shared with the base body and surfaces that are not shared with the base body. The base body can be a 3-dimensional structure and the method can further include determining that after the joining step, one or more faces of the tool body include an aperture and one or more faces of the tool body are solid. The base body can include a first aperture and joining the subset of cells forms a second aperture in the tool body that is fluidly connected to the first aperture in the base body. A subset of cells that are not used to form the assembly can be removed.

Creating a form with offset features can include offsetting the tool body away from the surfaces that are not shared with the base body and toward surfaces shared with the base body. Dividing the form into a plurality of cells can includes forming a first cell class including a cell that is bounded by the one or more surfaces of the tool body that are not shared with the base body prior to offset, the one or more surfaces of the tool body that are not shared with the base body after offset and one or more surfaces of the base body, forming a second cell class including a cell that is bounded by the one or more surfaces of the tool body after offset and one or more surfaces of the base body, forming a third cell class including a cell that is defined by a portion of the base body that is not overlapped by the tool body after offset and forming a fourth cell class including a cell that is defined by a portion of the base body that is overlapped by the tool body after offset. Joining the subset of cells can include joining the first cell class and the third cell class. Joining the subset of cells can include creating an adjacency graph showing which cells are adjacent to one another and determining a subset of cells of the fourth cell class to keep based on the adjacency graph. The second cell and the fourth cell can be discarded. Offsetting the tool body can include offsetting the shared surfaces of tool body a distance equal to a desired thickness of a wall of the assembly in the region of the tool body. The tool body can be offset a greater amount along an x-axis than along a y-axis. Offsetting the tool body can include offsetting surfaces that are shared with the base body a greater amount than the surfaces that are not shared with the base body and extending the surfaces to form a solid form. Creating a form with offset features can include offsetting the surfaces of tool body that are not shared with the base body toward the base body.

Offsetting the surfaces can include extending the surfaces, the offsetting and extending forming one or more extended offset surfaces. Dividing the form into a plurality of cells can include forming a first cell class including a cell that is bounded by the one or more surfaces of the tool body that are not shared with the base body prior to offset, the one or more surfaces of the tool body that are not shared with the base body after offset and one or more surfaces of the base body, forming a second cell class including a cell that is bounded by the one or more surfaces of the tool body after offset and one or more surfaces of the base body, forming a third cell class including a cell that is defined by a portion of the base body that is not overlapped by the tool body after offset and forming a fourth cell class including a cell that is defined by a portion of the base body that is overlapped by the tool body after offset. joining the subset of cells includes joining the first cell class and the third cell class. Joining the subset of cells can include creating an adjacency graph showing which cells are adjacent to one another and determining a subset of cells of the fourth cell class to keep based on the adjacency graph. The second cell and the fourth cell can be discarded. Dividing the form into a plurality of cells can include forming a fifth cell that is defined by a portion of the base body that is bounded by the one or more extended offset surfaces, but only if there is a gap between the portion and a portion of the base body that is bounded by the one or more extended offset surfaces and that is in direct contact with one of the one or more extended offset surfaces.

Systems and computer program products are also described.

The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1A:
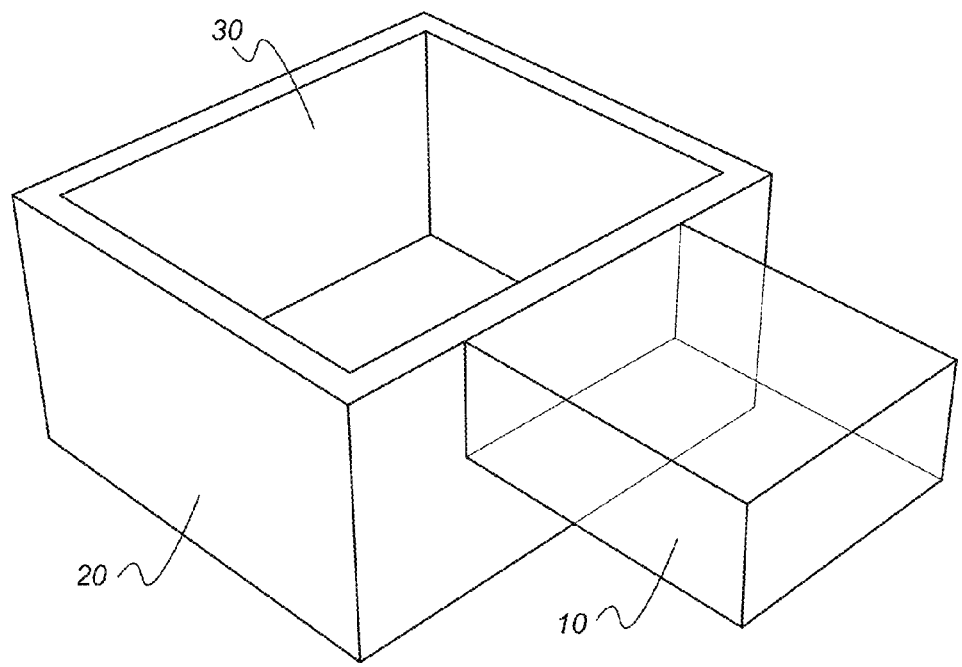
FIGS. 1A and 1B show an example tool body added onto a base body.
Figure 1B:
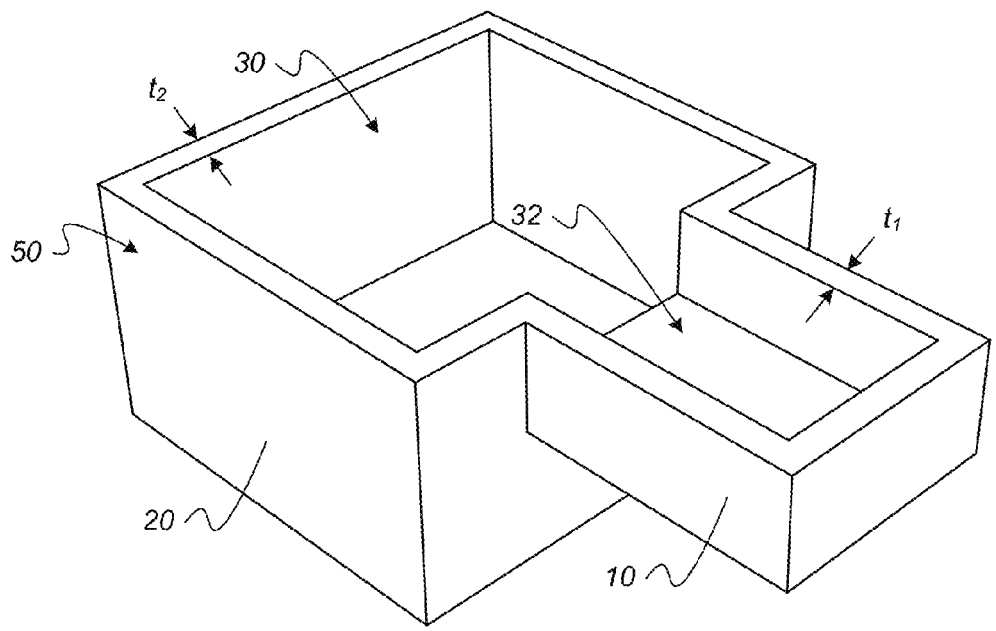

Processes of adding and integrating new sections onto existing complex forms that maintain the integrity of the existing form and allow for adding new shelled portions are described herein. FIGS. 1A and 1B show an example tool body added onto a base body. For purposes of convenience, a tool body as referred to herein is a section that is to be added onto an existing structure. The existing structure is referred to herein as the base body. A tool body 10 is added to an existing base body 20 where a recess 30 in the base body 20 is open to a recess 32 in the tool body 10, as shown in FIGS. 1A and 1B. The recesses in the base body 20 and the tool body 10 result in a product body with a shell 50, where the shell has a thickness of $t_1$ in the region of the tool body 10 and a thickness of $t_2$ in the region of the base body 20 prior to the addition of the tool body 10. Note that the base body 20 can include a shell section prior to the addition of the tool body, or can be a solid body. The tool body and base body are representations, objects, shapes, forms or bodies that exist with in a CAD model and are a two-dimensional or three-dimensional representation of an object that can be formed in the real world. The base body and tool body have a location, orientation, and can have constraints within the CAD model.

Figure 2:
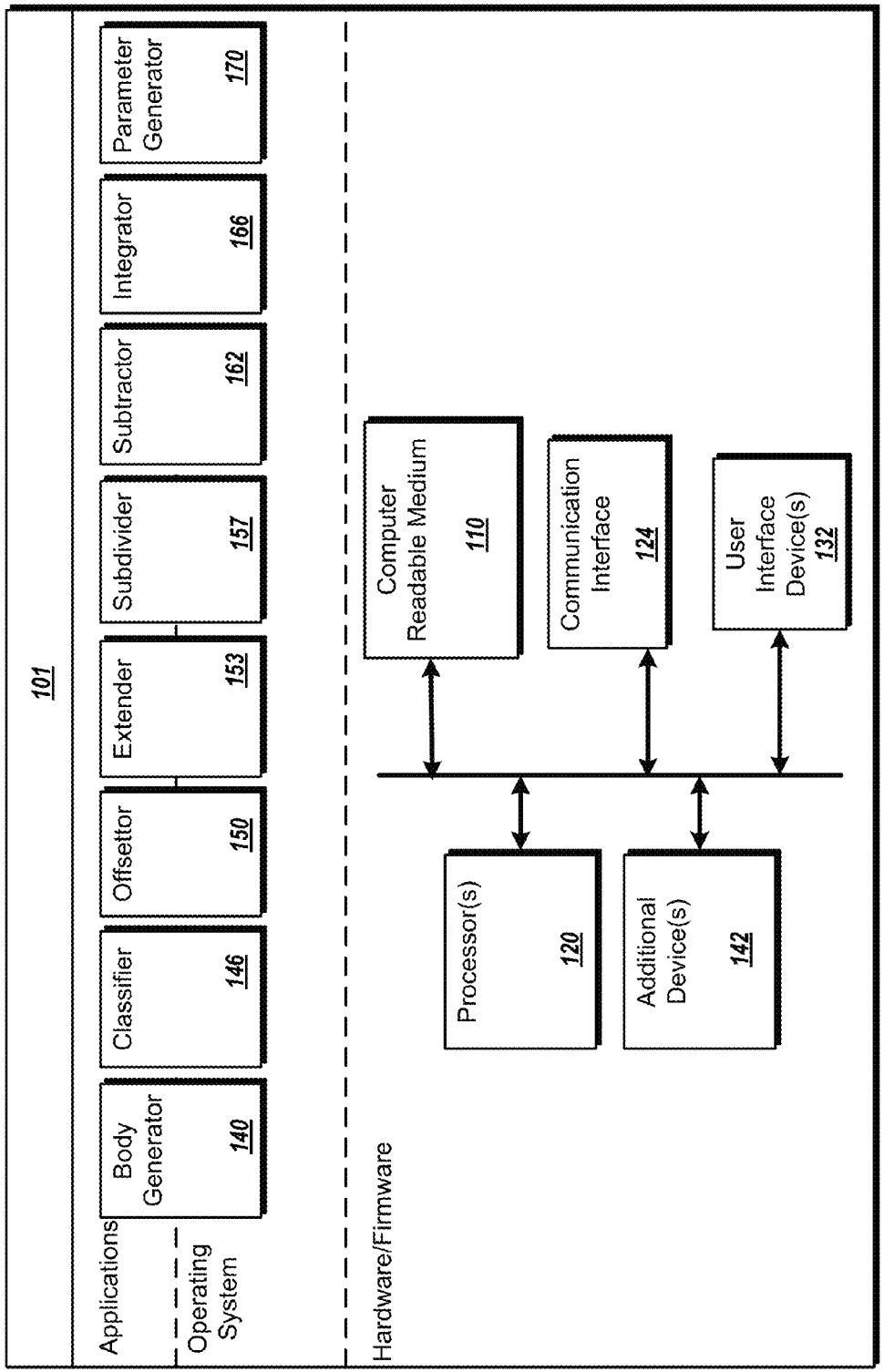
FIG. 2 is a schematic diagram of an example computing device.
Figure 3:
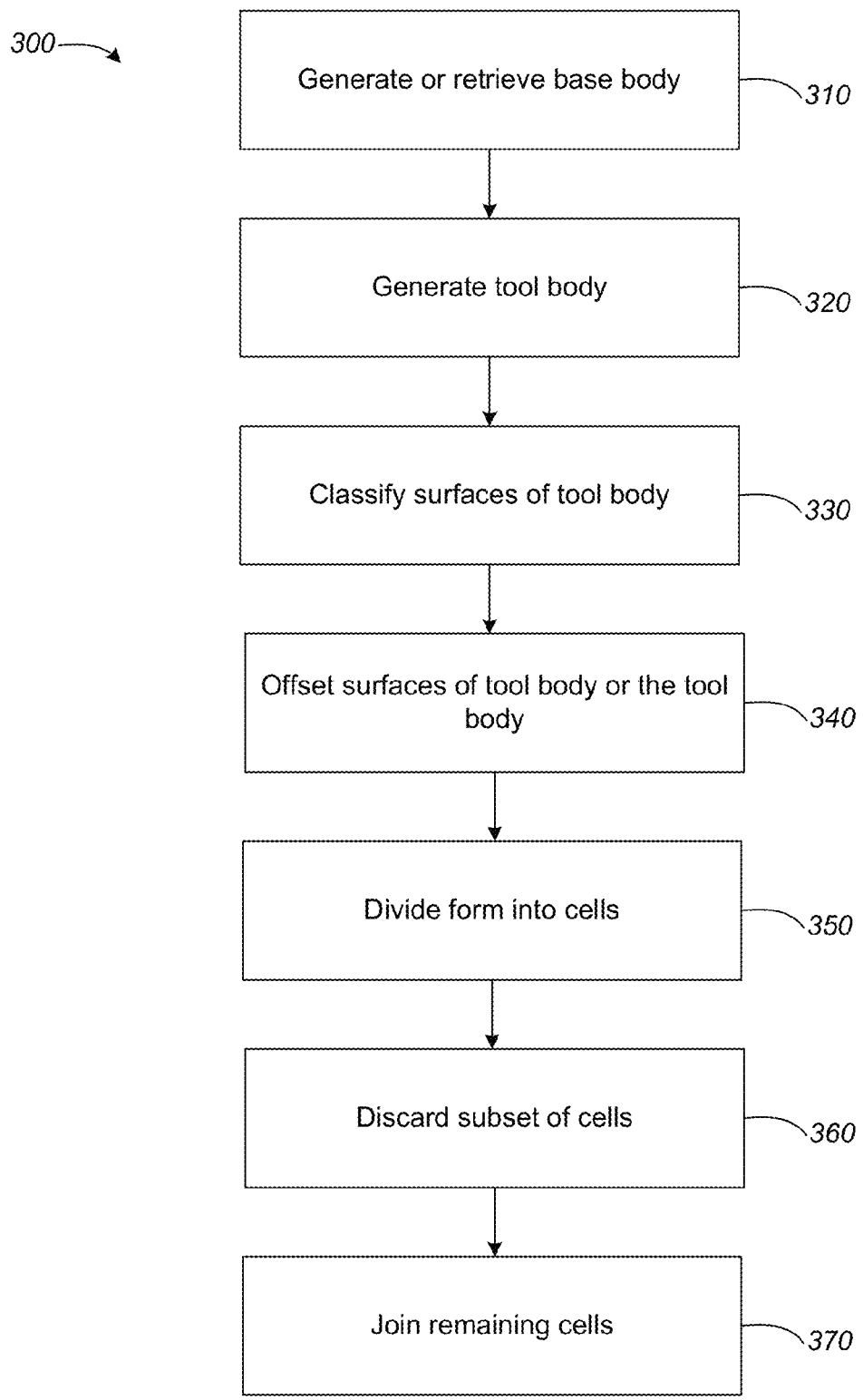
FIG. 3 is a flow diagram of an example shelling technique.
Figure 4:
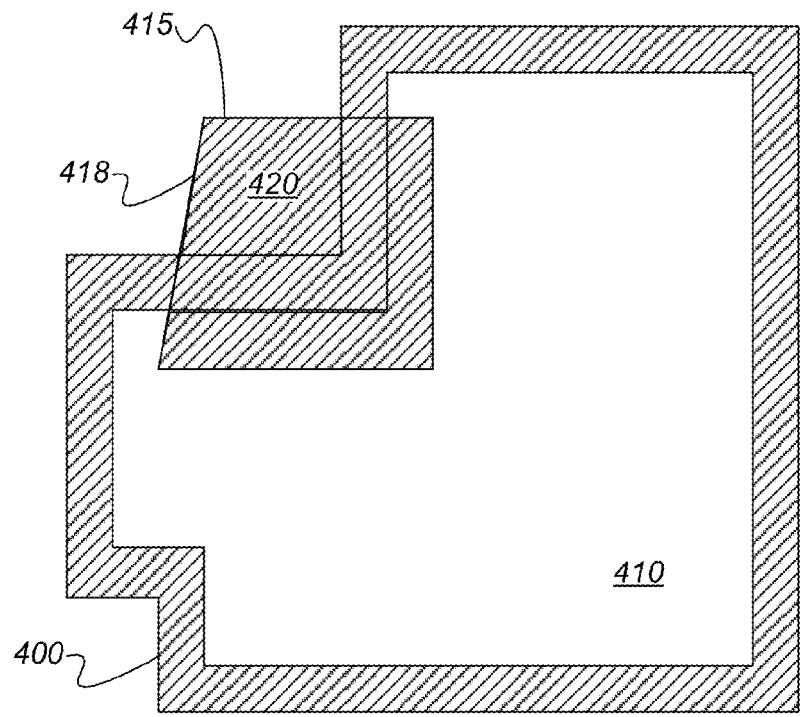
FIG. 4 is a cross-sectional view of a base body with a non-shelled tool body added on at a corner.

Referring to FIG. 2, a computing system 101 that is able to perform the processes described herein includes one or more data processing apparatus. While only one data processing apparatus is shown, multiple data processing apparatus can be used. The computer includes various modules, e.g. executable software programs, including a body generator 140, a classifier 146, an offsettor 150, an extender 153, a subdivider 157, a subtractor 162, an integrator 166 and a parameter generator 170. Each module runs as part of the operating system on the computing system, runs as an application on the computing system, or runs as part of the operating system and part of an application on the computing system.

The body generator 140 is configured to retrieve or form a base body. The classifier 146 classifies surfaces. The offsettor 150 can offset forms, surfaces or lines. The extender 153 extends surfaces or lines. The subdivider 157 subdivides a form or an aggregation into cells. The subtractor 162 subtracts or ignores unneeded cells. The integrator 165 integrates cells of interest, or adds cells together. The parameter generator 170 provides parameters for one or more of the offsettor 150, the extender 153, and the subtractor 162. The components need not be on a single computing system, but can be distributed across a number of systems (e.g., 101) connected by one or more computer networks.

The computing system 101 can also have hardware or firmware devices including one or more processors 120, one or more additional devices 142, computer readable medium 110, a communication interface 124, and one or more user interface devices 132. Each processor 120 is capable of processing instructions for execution within the computing system 101. In some implementations, the processor 120 is a single or multi-threaded microprocessor, for example. Each processor 120 is capable of processing instructions stored on the computer readable medium 110 or on another storage device. The computing system 101 uses its communication interface 124 to communicate with one or more computers, for example, over a network. Examples of user interface devices 132 include a display, a camera, a speaker, a microphone, a tactile feedback device, a keyboard, and a mouse.

The computing system 101 can store instructions that implement operations associated with the modules described above, for example, on the computer readable medium 110 or one or more additional devices 142, for example, one or more of a floppy disk device, a hard disk device, an optical disk device, or a tape device. In some implementations, the computing system 101 also stores additional data, for example, model data, a document-query database, or other data, on the computer readable medium 110 or one or more additional devices 142.

Referring to FIGS. 3-15, a technique 300 of forming a shelled body is described. A base body is generated or retrieved from storage (step 310). The base body 400 has one or more recesses, apertures or hollow regions 410. A representation of a tool body 420, simply referred to as a tool body herein, is then generated (step 320). The tool body 420 is the portion that will be added onto the base body 400. In some implementations, the tool body 420 is generated as a two-dimensional representation of a solid body. That is, the tool body is not already shelled, but is a contiguous body without apertures. In various implementations, the tool body 420 is generated by defining one or more of the outermost surfaces of the tool body. For example, a single line 415 can define one surface of the tool body. The other surface of the body can be defined by extending a line 418 from the end of the single line 415 to the base body 400. The line 418 can be extended perpendicular to the single line 415 or at an angle, such as an angle that allows the molded product to be easily removed from a mold. The line 418 can be extended beyond an outer surface of base body 400 to show where the tool body intersects with the base body, as described further below. The external surfaces of the tool body 420 can have any configuration, including straight, curved or a combination of straight and curved walls or surfaces. For example, as few as one or two straight lines may define the tool body, or many curves and straight lines may define the tool body. More information regarding how to form the tool body 420 and combine it with the base body 400 can be found in U.S. Pat. No. 7,031,790, which is incorporated herein by reference. The tool body 420 is placed adjacent to the base body 400. In some implementations, the tool body 420 does not overlap the base body 400 and merely abuts the base body 400.

Figure 5:
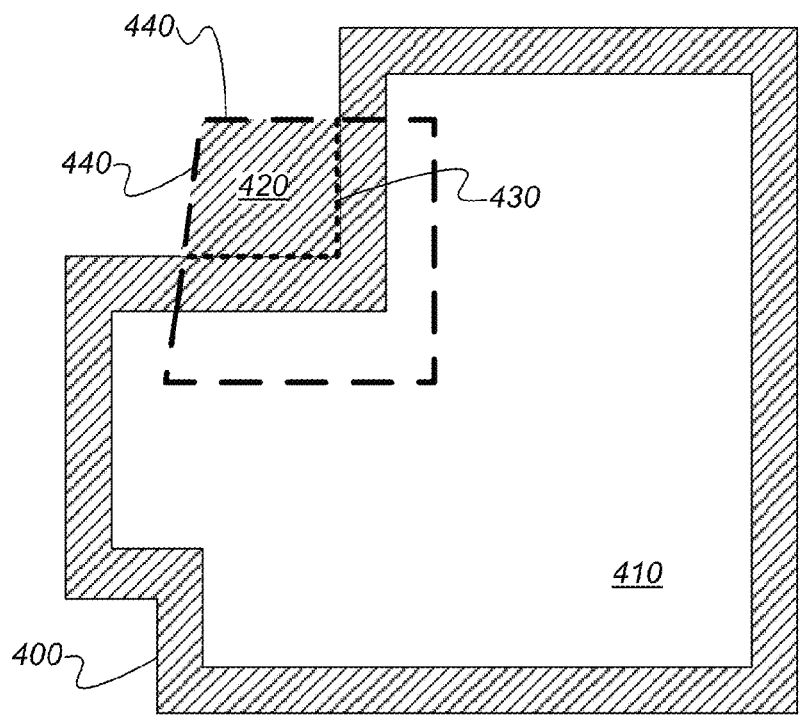
FIG. 5 illustrates example categorized surfaces.

Referring back to FIG. 3 and to FIG. 5, each of the surfaces of the tool body 420 are classified (step 330). Any surfaces of the tool body 420 that are coincident or are overlapping with the base body 400 are classified as common surfaces 430. Any surfaces of the tool body 420 that are not coincident with base body 400 or are non-overlapping faces are classified as new surfaces 440. In some implementations, the user can indicate which surfaces of the tool body 420 are to remain open and which are to remain closed. An open surface is open to the environment surrounding the base body 400, e.g., the surface above recess 32 in FIG. 1B. A closed surface is an intact surface that does not expose an interior of the tool body to the environment surrounding the base body, such as the walls that define recess 32. In some implementations, different cross sections of the tool body 420 and base body 400 can be displayed to allow a user to designate the surfaces of the tool body 420 as open or closed. In some implementations, the base body 400 and tool body 420 can be rotated along the x, y, and z axes to allow the user to view and designate the surfaces as open or closed. The offsetting steps are not applied to any surfaces that are designated as open.

Figure 6:
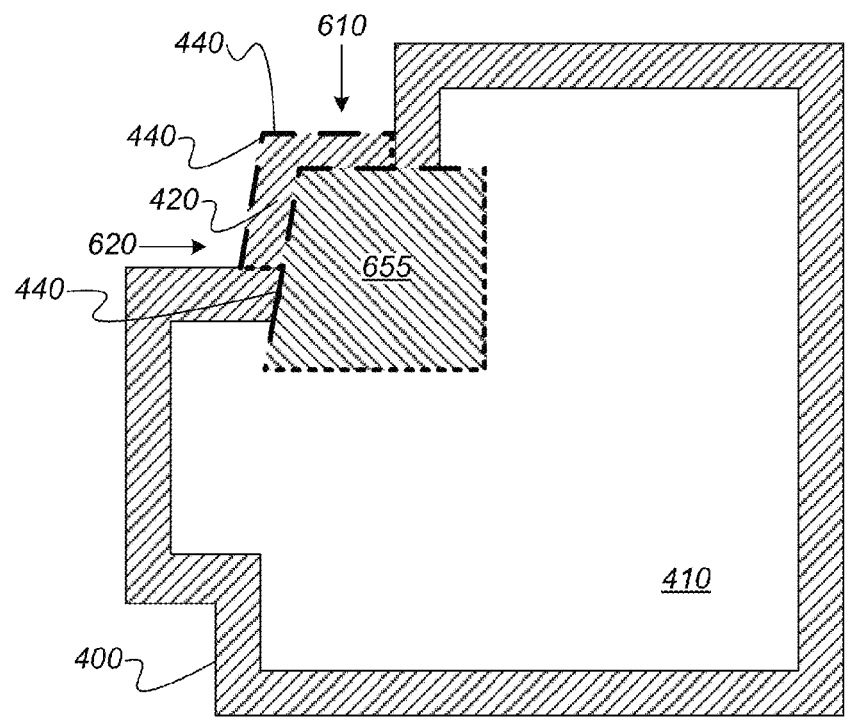
FIG. 6 illustrates an example offset tool body.

Referring back to FIG. 3 one or more surfaces of the tool body 420 are offset from their starting location (step 340). Referring to FIG. 6, the starting location of the surfaces is the location where the tool body 420 is initially indicated as being joined to the base body 400. For new surfaces 440, the starting location of the surface will be the external surface of the final product body, specifically, the outer edge at the tool body location of the object that results from tool body being added to the base body and after the shelling technique has been performed. There are at least two ways of performing the offset step.

In a first implementation of the technique, the tool body 420 is shelled and offset. The new surfaces 440 of the tool body 420 are offset inward or toward the base body 400. The inward direction is shown by arrows 610 and 620. If the new surface 440 is not an open surface, that is, it is a closed surface, the offset value is equal to a desired thickness $t_1$ of the shell (see FIG. 1B). If a new surface 440 is open, see, e.g., region above recess 32 in FIG. 1B, there can be no offset.

For surfaces that are classified as common surfaces 430, the offset is in the same direction as arrows 610, 620, but the offset is to a location within an inner wall of the base body 400 and is therefore referred to as an outward offset. In some implementations, the offset of common surfaces or faces is about 1.5 times the base body wall thickness $t_2$ (see FIG. 1B). The offset can be another multiple of the base body wall thickness, such as a multiple that is 1 or greater. This ensures complete removal of common walls, as described further herein. The offset new faces and offset common faces can be extended to define a closed shape. When the tool body 420 surfaces are offset, effectively offsetting new surfaces 440 and the common surfaces 420 together albeit by either the same or different amounts, the offset surfaces define an offset tool body 655. The offset tool body 655 partially overlaps the base body 400 as well as a region 670 within the base body 400. In some implementations, the overlap with the region 670 within the base body overlaps a recess in the base body 400 that will be open to an interior of the new shelled portion of the final product. The new shelled portion refers to the portion of the final product that is within a footprint of the original location of the tool body. The offset tool body 655 can have an area that is greater than the area of the original tool body 420.

Figure 7:
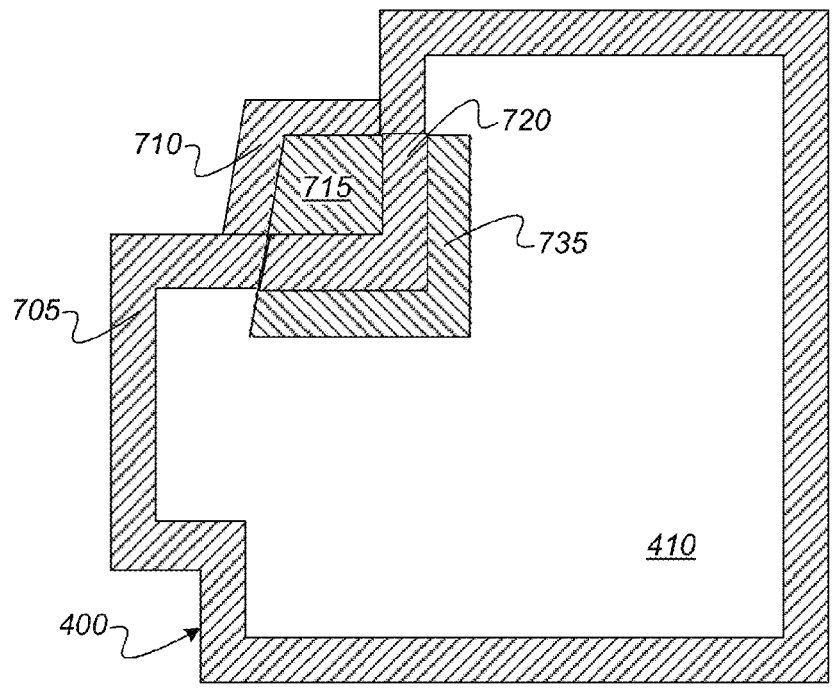
FIG. 7 illustrates cells classified after the offset.

Referring back to FIG. 3, the form that results from the base body 400, original tool body 420 and offset tool body 655, referred to as the resulting form, is divided into cells (step 350). In some implementations, the resulting form is divided into four or more cells. Referring to FIG. 7, a non-intersecting base body cell 705 is the region of the base body 400 that does not overlap with the original tool body 420 or the offset tool body 655. A non-intersecting tool body cell 710 is the cell defined by the region of the original tool body 420 that is not overlapped by the offset tool body 655 or the base body 400. An intersecting tool body cell 715 is a region of the original tool body 420 that is overlapped by the offset tool body 655. An intersecting base body cell 720 is a region of the base body that the offset tool body 655 overlaps. A non-intersecting recess cell 735 is a portion of the offset tool body 655 that overlaps a non-filled region 670 within the based body 400, such as a recess. Note that in any cell can be a single stand alone contiguous region that or can be a group of cells that encompass more than one non-contiguous region.

Figure 8:
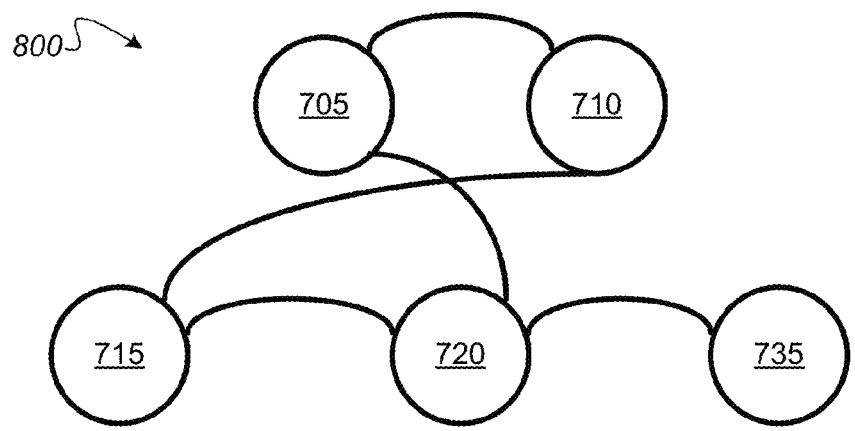
FIG. 8 illustrates an example adjacency diagram.

Referring to FIG. 8, an adjacency graph 800 for the cells shows which cells contact the other cells at more than a single point or line, but contact one another along a surface. The adjacency graph 800 can be used to determine which cells are to be removed and which cells are to be kept for the final product. In some embodiments, the adjacency graph 800 and the cell classification are used to determine whether a cell is kept or discarded. Intersecting cells of the offset tool body 655 and the base body 400 which are separated from the tool body 400 in the adjacency graph are kept, not discarded.

Figure 9:
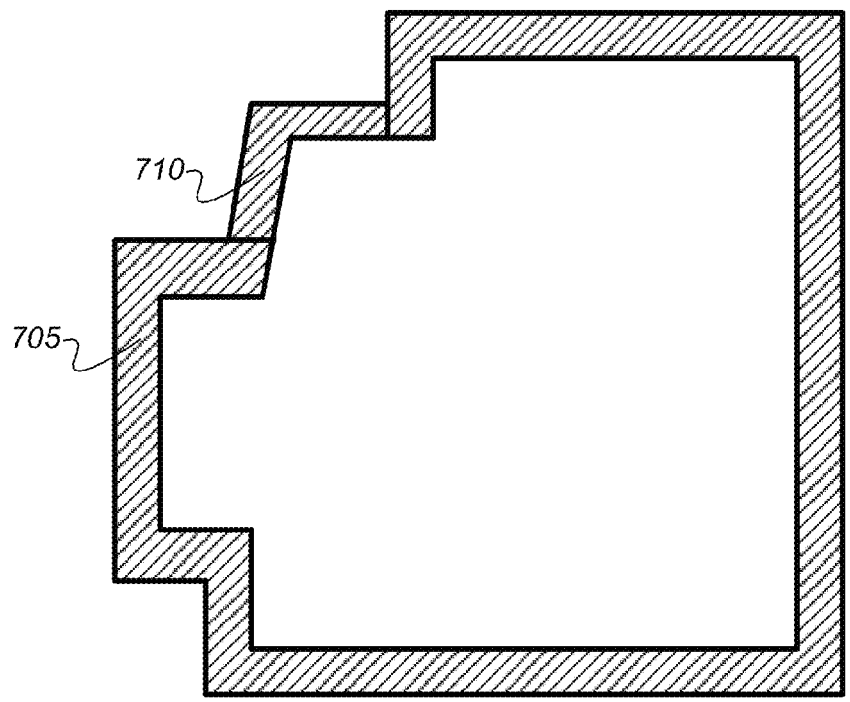
FIG. 9 illustrates an example shelled object after addition and shelling of the tool body.

Referring back to FIG. 3 and to FIG. 9, a subset of the cells is discarded (step 360). The intersecting tool body cell 715, the intersecting base body cell 720 and the non-intersecting recess cell 735 are discarded. While the term "discarded" is used, the subset of cells can be subtracted from the resultant form or merely ignored. Note that intersections cause by the offset factor being greater than 1 are not to be discarded.

Figure 10:
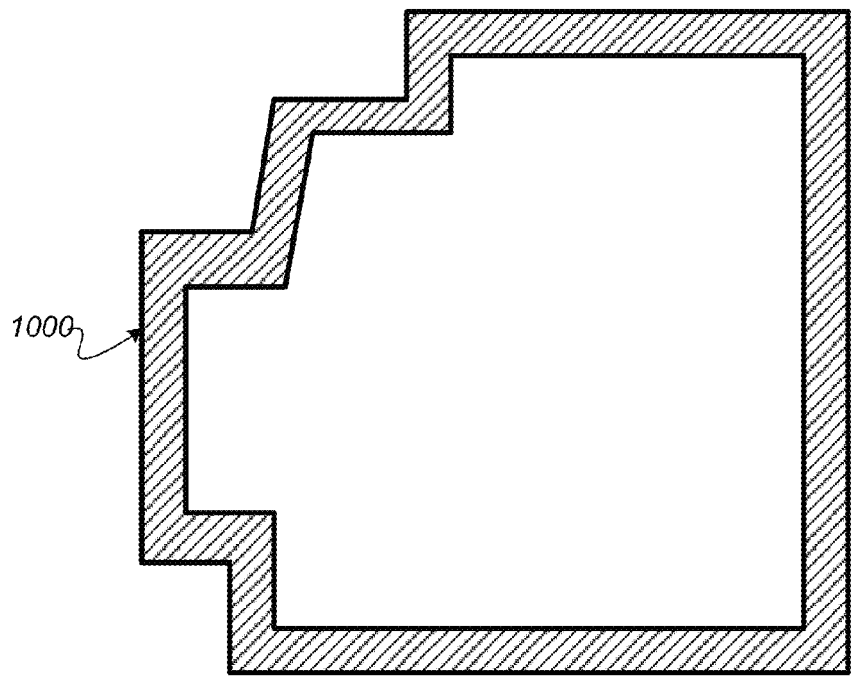
FIG. 10 illustrates the shelled body after all shelled portions are joined together.

Referring back to FIG. 3 and to FIG. 10, the remaining cells are joined (step 370). The join can be a Boolean join to form an integrated product 1000.

Figure 11:
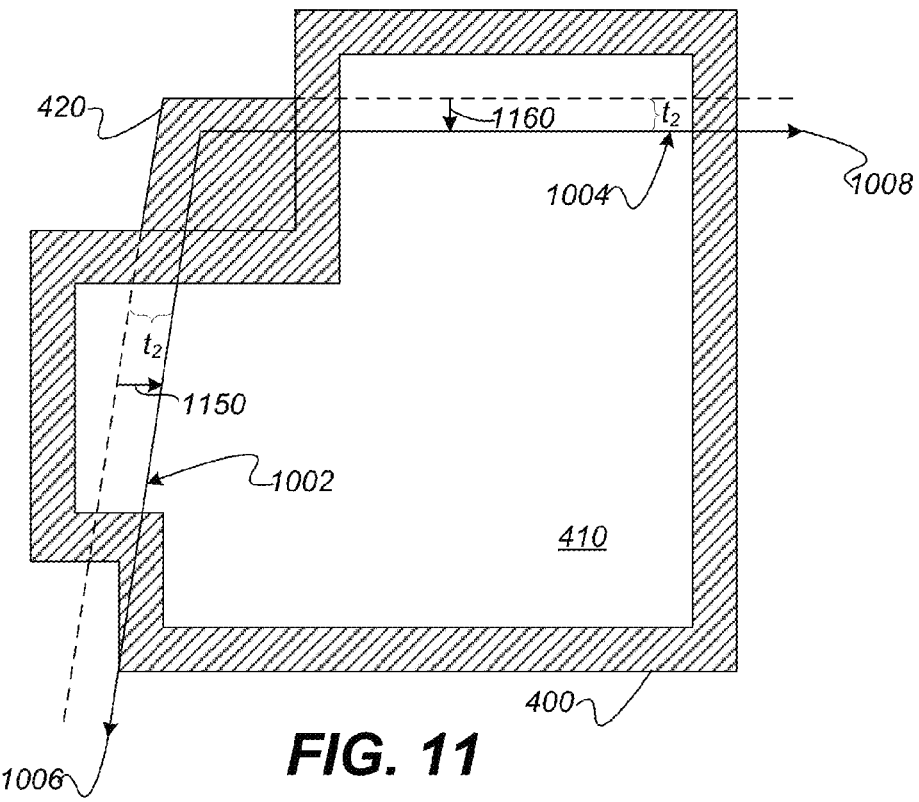
FIG. 11 illustrates a cross-sectional view of an example base body with a non-shelled tool body added on at a corner with new surfaces offset and extended.

As noted, there is at least one other implementation for performing some of the above mentioned steps. Referring to FIG. 11, in step 340, in lieu of offsetting the tool body to form the offset tool body 655, the new surfaces 440 are extended over the base body 400 to form extended surfaces 1002 and 1004. In some implementations, only the surfaces that intersect with the base body need to be extended. The extension can be at a tangent to a point at which the tool body 420 contacts the base body 400 or can continue along a path that the new surface 440 extends along. If the new surface 440 is a curve, the extension can have the same radius of curvature as the tool body surface has at a region directly adjacent to the base body 400. The extended surfaces 1002, 1004 are offset inward toward the base body 400, as shown by arrows 1150 and 1160. Alternatively, the offset can occur prior to the extension. In some implementations, the surfaces 1002, 1004 are offset toward a center of the tool body. In some implementations, the surfaces 1002, 1004 are offset toward a point on the tool body that the user has selected. This enables a user to form walls of varying thickness in the region of the final product where the tool body has been added. The extended surfaces 1002 and 1004, or extended surface if there is only one, are offset a distance equal to a desired thickness of the shell wall, thickness $t_2$, as shown by arrows 1150 and 1160. In some implementations, the extended surfaces 1002, 1004 are extended along a tangent to the surface of the tool body 420 at the point that the tool body 420 meets the base body 400. In some implementations, only the new surfaces and not open surfaces of the tool body 420 are offset. In some implementations, open faces are not offset. In some implementations, all of the open edges of the extended surfaces 1002, 1004 are extended to a bounding volume or outer edge of the base body 400.

Figure 12:
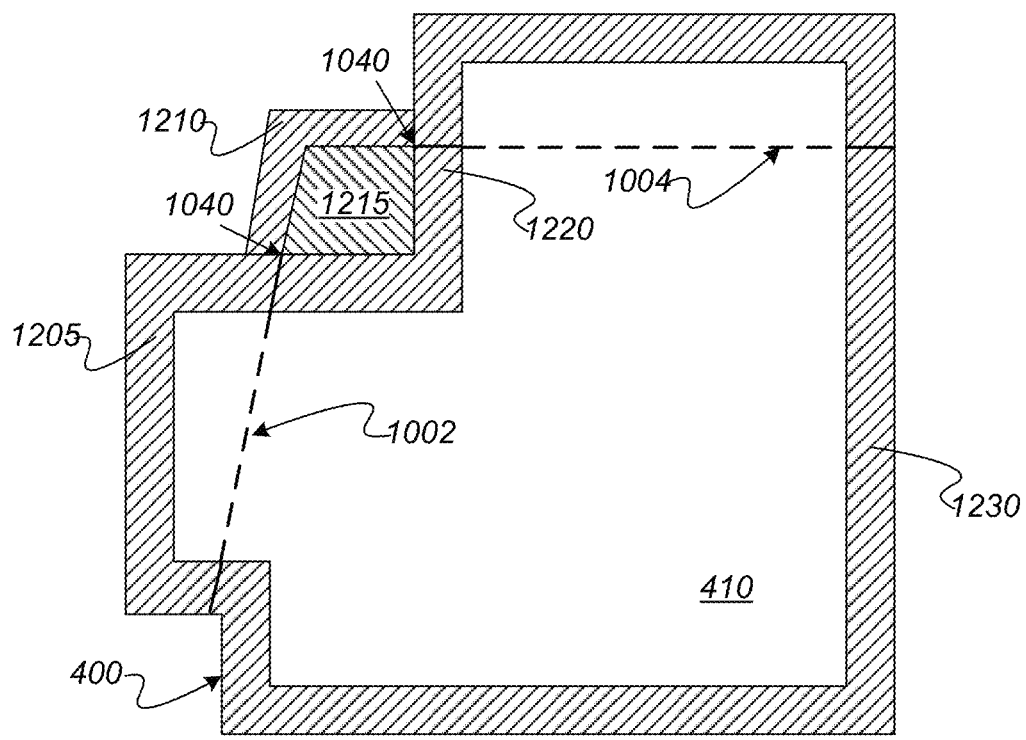
FIG. 12 illustrates cells classified after the offset and extension.

Referring to FIG. 12, the resulting form is divided into cells (step 350). A non-bounded base body cell 1205 is the region of the base body 400 that is not bounded by the offset extended surfaces 1002, 1004, or is not inward from the extended surfaces 1002, 1004 in the direction that the extended surfaces 1002, 1004 were offset. A non-intersecting tool body cell 1210 is the cell defined by the region of the original tool body 420 that is not overlapped by a region bounded by the offset extended surfaces 1002, 1004 and the base body 400. An intersecting tool body cell 1215 is a region of the original tool body 420 that is overlapped by the region bounded by the offset extended surfaces 1002, 1004. An intersecting base body cell 1220 is a region of the base body that is overlapped by the region bounded by the offset extended surfaces 1002, 1004 and more specifically, that is directly adjacent to the offset extended surfaces at a meeting point 1040 where the offset extended surfaces contact the tool body. A saved intersecting base body cell 1230 is a region of the base body 400 that is overlapped by the region bounded by the offset extended surfaces 1002, 1004, but that has a gap in the base body, e.g., a recess or aperture, that is between it and the intersecting base body cell 1220. In some implementations, the saved intersecting base body cell 1230 is a portion of the base body 400 that is not contiguous with the intersecting base body cell 1220 along the offset extended surface 1002, 1004. That is, along offset extended surface 1002, 1004 there is a space in one of the three dimensions that is free of base body material between the intersecting base body cell 1220 and another part of the base body 1000 that is also within a boundary defined by the extended surfaces 1002, 1004.

Figure 13:
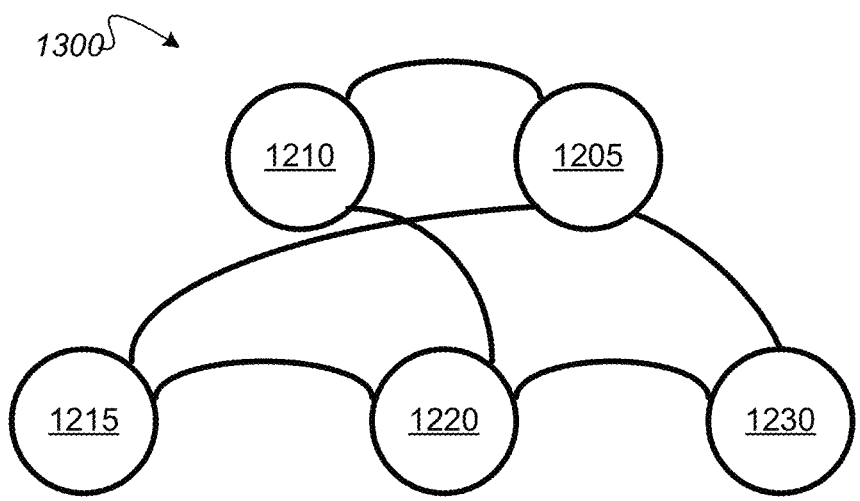
FIG. 13 illustrates another example adjacency diagram.

FIG. 13 shows an adjacency graph 1300 for the resultant cells shows which cells contact the other cells. The adjacency graph 1300 can be used to determine which cells are to be removed and which cells are to be kept for the final product.

Figure 14:
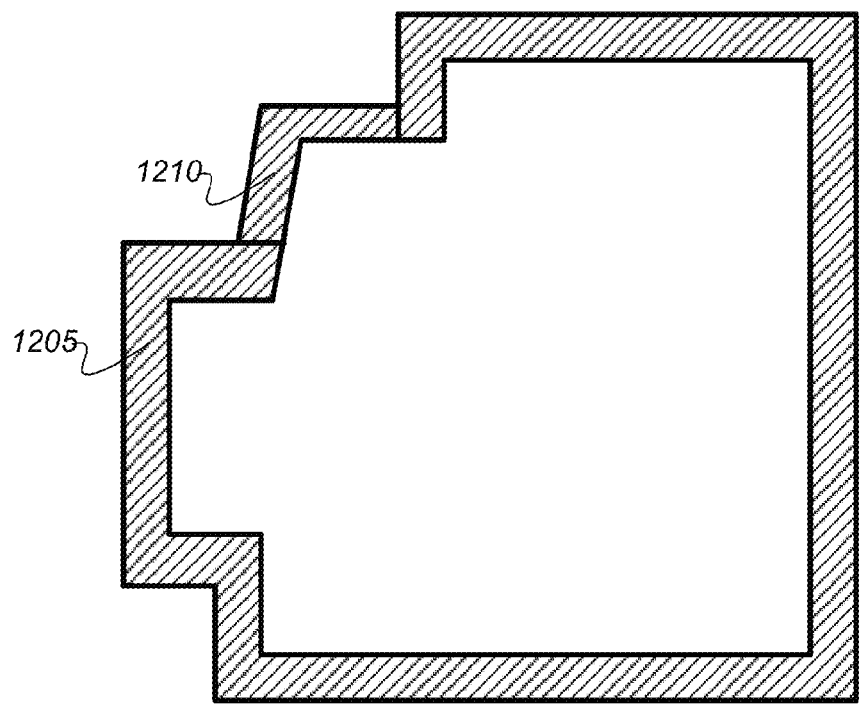
FIG. 14 illustrates an example shelled object after addition and shelling of the tool body.

Referring back to FIG. 3 and to FIG. 14, a subset of the cells is discarded (step 360). The intersecting tool body cell 1215 and the intersecting base body cell 1220 are discarded. This leaves the non-intersecting tool body cell 1210 and the non-bounded base body cell 1205.

Figure 15:
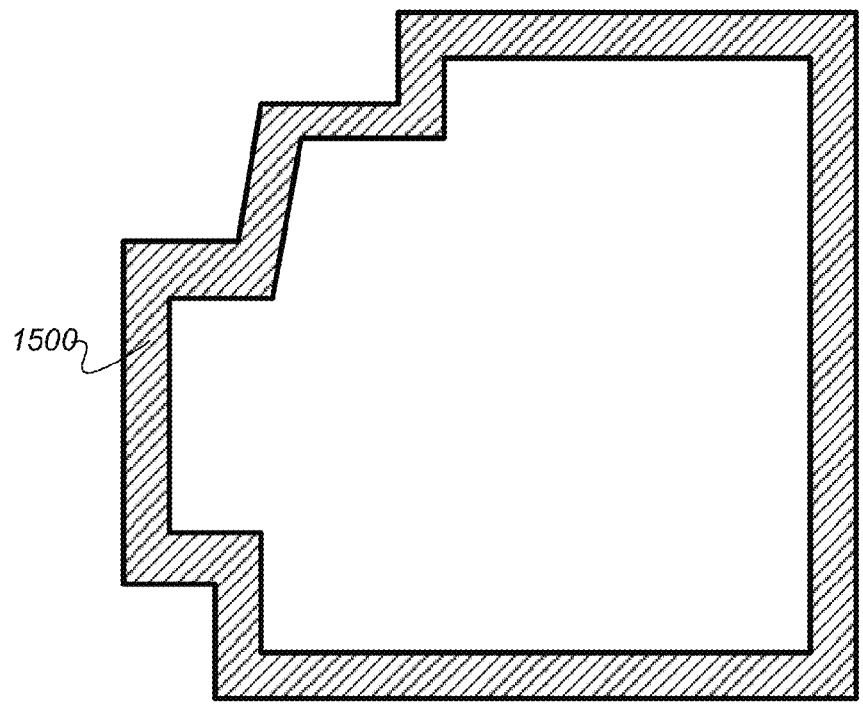
FIG. 15 illustrates the shelled body after all shelled portions are joined together.

Referring back to FIG. 3 and to FIG. 15, the remaining cells are joined (step 370). Thus, the non-bounded base body cell 1205 and non-intersecting tool body cell 1210 are joined. The join can be a Boolean join to form an integrated product 1500.

Although the two main implementations provide the same results for the base and tool body shown, this may not be true for all types of shapes. The first implementation of the offsetting technique described above (and shown in FIGS. 4-10) can take less computation memory, but may not always provide the desired results. This technique is referred to as the tool body offset technique. However, in general, the first implementation may be implemented with almost any solid modeling system without enhancement. The second implementation of the offsetting technique (as shown in FIGS. 11-15) may result in the desired result, but may require more computing resources. This second implementation is referred to as the surface offset and extension technique. The second main implementation may cover a wider set of topology cases, as described further herein.

Figure 16:
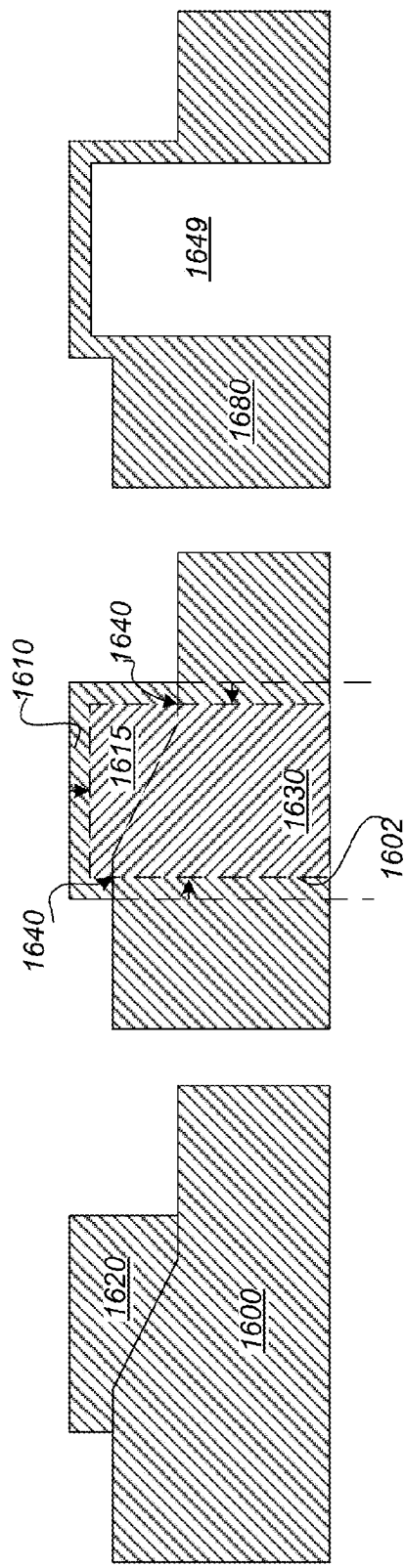
FIG. 16 illustrates an example of creating a shelled form from a solid form using the surface offset technique.

Referring to FIG. 16, a tool body 1620 is added onto a base body 1600 using the second implementation of the offsetting technique, the surface offset and extension technique. The surfaces of the tool body 1620 are extended across the base body 1600 and offset inwards toward a center of the tool body 1620 the distance of the desired thickness of the shell. Any portion of the base body 1600 that is within the bounds of the extended offset surfaces 1602 of the tool body and that is directly adjacent to a meeting point 1640 where the extended offset surfaces 1602 cross from the tool body to the base body 1600 is a region to be shelled 1630. The portion of the tool body 1620 within the offset extended boundaries is also designated as a region to be shelled 1615. The regions to be shelled 1615, 1630 are removed to form a hollow 1649 within the shelled body 1680. The shelled body 1680 is completed by joining the shelled tool body to the shelled base body. The joining occurs along the surface where the tool body meets the base body and includes the meeting point 1640. Note that the hollow 1649 extends through the entire base body because no recesses exist in the base body. This would be true as well if there were recesses within the base body 1600 before the shelling technique so long as the extended offset surfaces 1602 do not overlap the recesses. Thus, in these situations the shelling technique forms a recess in the base body where there previously was not a recess.

Figure 17:
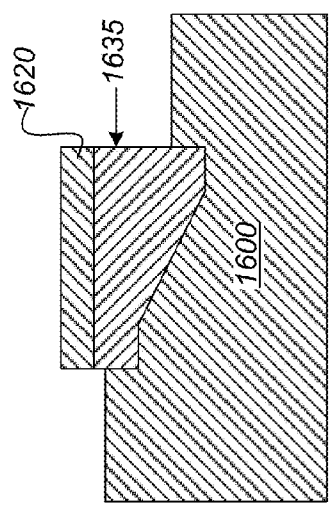
FIG. 17 illustrates an example of offsetting a tool body on a solid form.

Referring to FIG. 17, the tool body offset technique would not work without additional modifications, because the offset body 1620 would leave one or more sides 1635 without any thickness. Further, the tool body offset technique may only create a small recess in the base body and not a recess that extends through the entire product body.

Figure 18:
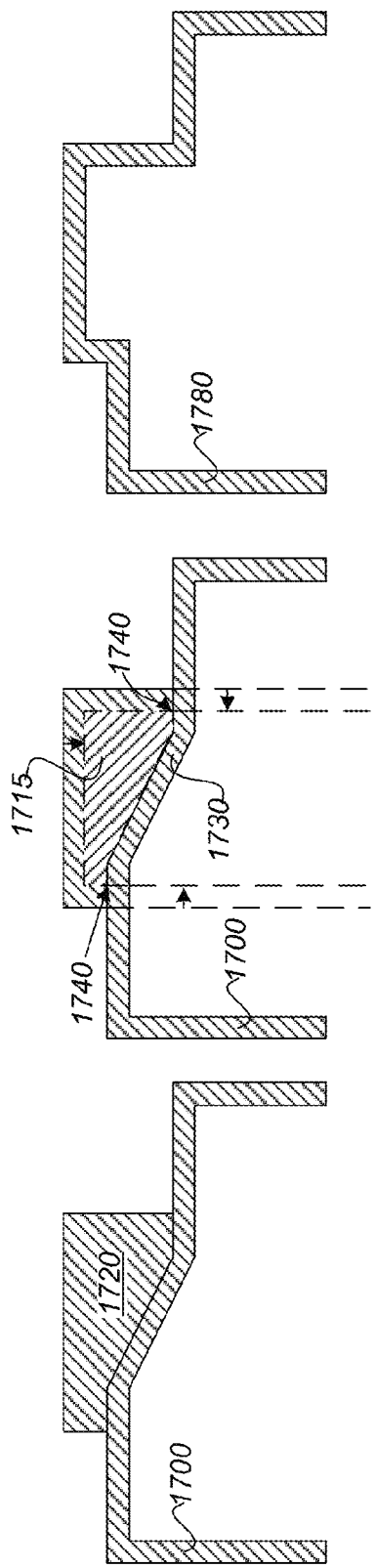
FIG. 18 illustrates an example of creating a shelled form from a shelled body and a tool body using the surface offset technique.

Referring to FIG. 18, a similar shelled tool body add technique is performed to add a shelled tool body to an already shelled body 1700. Again, a tool body 1720 is placed adjacent to the shelled body 1700. The new surfaces are extended and offset. Similar to the add shown in FIG. 16, the point 1740 at which the offset extended surface contacts the base body is used to determine that a portion of the base body is to be removed 1730. The portion of the tool body 1720 to be removed 1715 is defined by the offset tool body surfaces and one more base body surfaces, such as the surfaces that are shared with the tool body. The remove and add steps result in a shelled product body 1780. When a tool body to be shelled is added to a shelled base body, two recesses can be joined.

Figure 19:
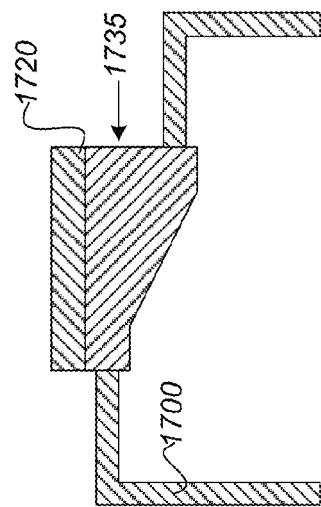
FIG. 19 illustrates an example of offsetting a tool body on a shelled form.

Referring to FIG. 19, again, a tool body offset technique leaves a wall 1735 with zero thickness and thus, the surface offset technique is a better solution.

Figure 20:
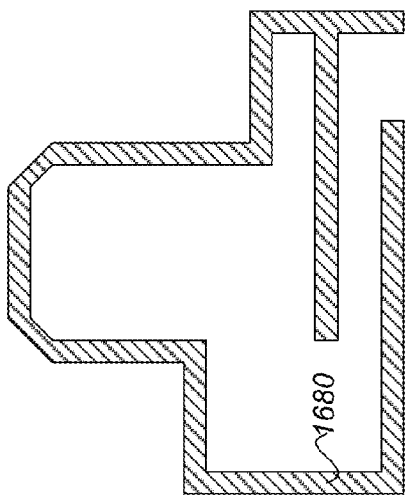
FIG. 20 illustrates an example of creating a shelled form from a shelled body having internal support structures.
Figure 20:
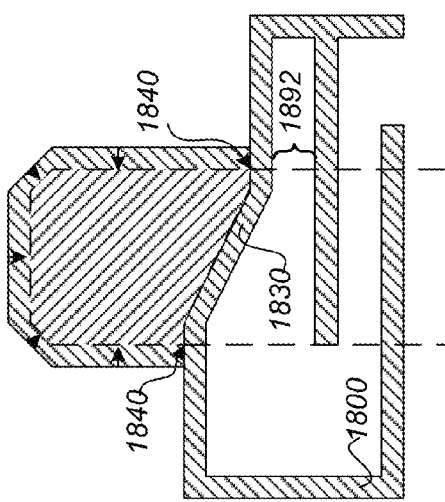
Figure 20:
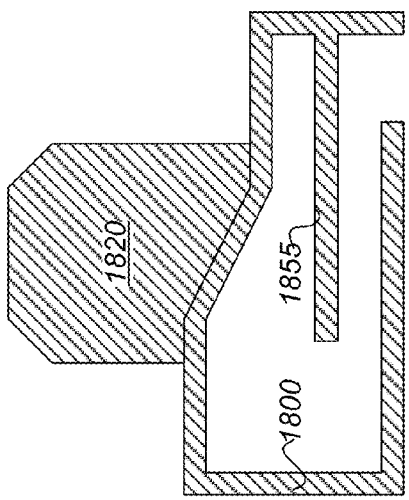

Referring to FIG. 20, a shelled body 1800 with internal support structure 1855 has a tool body 1820 added onto its side. The surfaces of the tool body are offset and extended. Any region of the shelled body 1800 that is directly adjacent to the meeting point 1840 at which the extension contacts the base shelled body 1800 and that is within the offset surfaces is a region of the base body to be shelled 1830. Any region 1892 between internal support structures 1855 and the region of the body to be shelled 1830 that is free of material in at least one direction or along one axis is preserved. What is meant by in at least one direction is that the figures show a 2-dimensional view of the tool body and base body. However, the bodies are actually 3-dimensional bodies or represent 3-dimensional bodies. Thus, any open space along a length, width or height of the device, depending on the wall of the base body that the tool body is being added to determines that a portion of the base body bounded by the offset extended surfaces is to be preserved. For example, if the tool body is being added to a side surface of the base body, any empty space or gap between the top and the bottom of the device that intersects an extended surface of the tool body preserves internal support structures 1855 that are on an opposite side of the gap from the region of the body to be shelled 1830.

Figure 21:
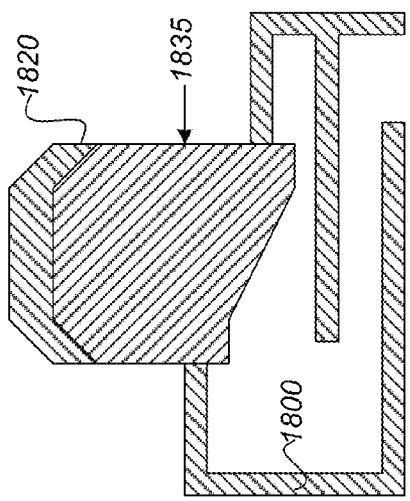
FIG. 21 illustrates an example of offsetting a tool body on a shelled body having internal support structures.

Referring to FIG. 21, offsetting the tool body forms wall sections 1835 with zero thickness and therefore the offset surface technique is superior, even if computationally more expensive. Note that if a support is too close to the wall that the tool body is added to, the wall may be removed with the tool offset technique.

Figure 23:
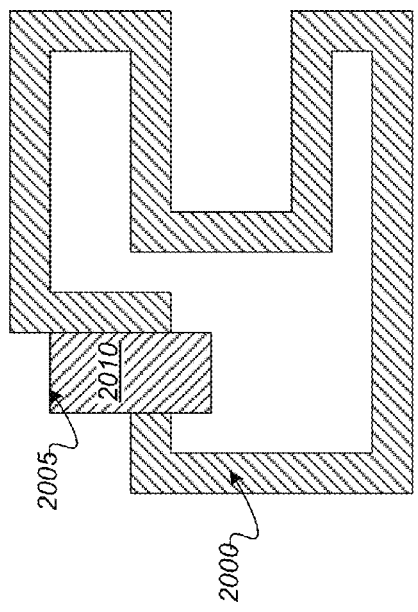
FIG. 23 illustrates the tool body completed from the surface.
Figure 22:
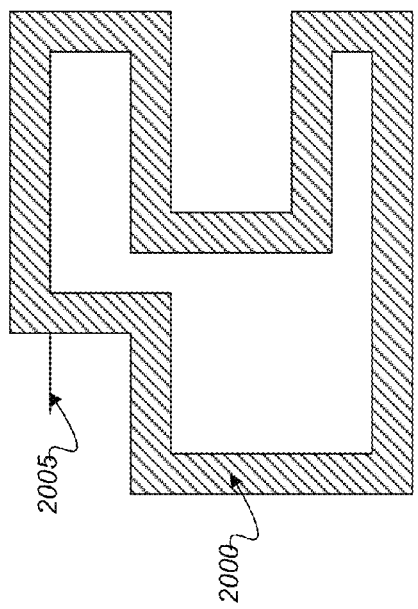
FIG. 22 is a cross-sectional view of a base body with one surface of a tool body shown.

Referring to FIG. 22, a tool body can be defined by a single exterior surface 2005, which is not coincident to any external surfaces of the base body 2000. The exterior surface 2005 is on an external side of the base body 2000. That is, the base body forms a shell around a recess and the recess is in the interior of the base body, where the exterior is on the opposite side of the base body. As shown in FIG. 23, the tool body is formed by extending a line towards the base body 2000 from an end of the surface 2005. As shown here, the line is extended at a right angle from the surface 2005 to form the tool body 2010. Oblique angles, such as obtuse or acute angles could alternatively be selected. In some embodiments, the extension of the line from the surface 2005 is such that it only overlaps the base body 2000 one time. Thus, the tool body does not extend over walls of the base body other than the walls that the tool body is coincident with.

Figure 25:
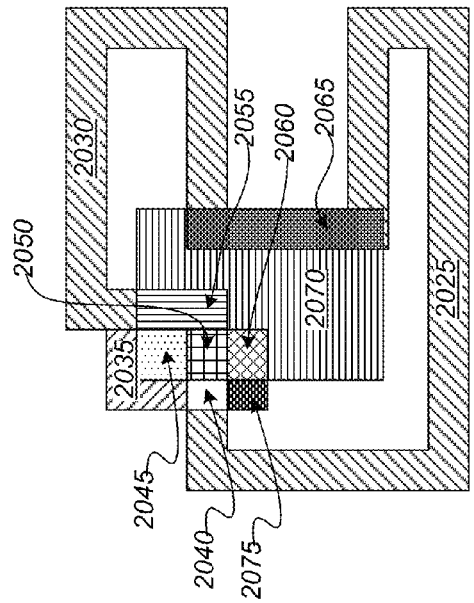
FIG. 25 illustrates cells classified after the offset.
Figure 24:
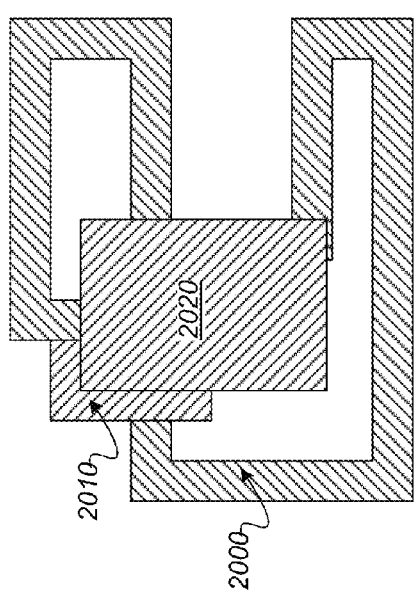
FIG. 24 shows an offset tool body.

Referring to FIG. 24, an offset body 2020, generated based on the tool body 2010, is shown with the tool body 2010 and the base body 2000. The offset body 2020 overlaps the base body 2000 in multiple regions. All of the overlapping and non-overlapping regions are then classified into individual cells, as shown in FIG. 25. A region of the tool body that does not overlap the base body or tool body and is external to the base body is designated an external tool body cell, shown as cell 2035. An region where the tool body only overlaps the base body, but not the offset body is designated an intersection of tool body and base body cell, shown as cell 2040. A region of the tool body that only overlaps the offset body and is on an exterior or interior side of the base body is designated the intersection of the tool body and offset body cell, shown as cells 2045 and 2060. A region where all of the tool body, base body and offset body overlap one another is designated the intersection of the tool body, base body and offset body cell, shown as cell 2050. A region where the offset body only overlaps the base body, but not the tool body (and is either adjacent to the tool body or is not adjacent) is designated the intersection of the offset body and the base body cell, shown as cells 2055 and 2065. The region where the offset body does not overlap any other body is designated the offset body cell, shown as cell 2070. The region of the base body that is not overlapped by the tool body or the offset body is designated the base body cell, shown as cells 2025, 2030. A region of the tool body that does not overlap the base body or the offset body and which is on an interior of the base body is designated the interior tool body cell, shown as cell 2075. Any one of the cells can actually comprise a plurality of non-contiguous cells.

Figure 26:
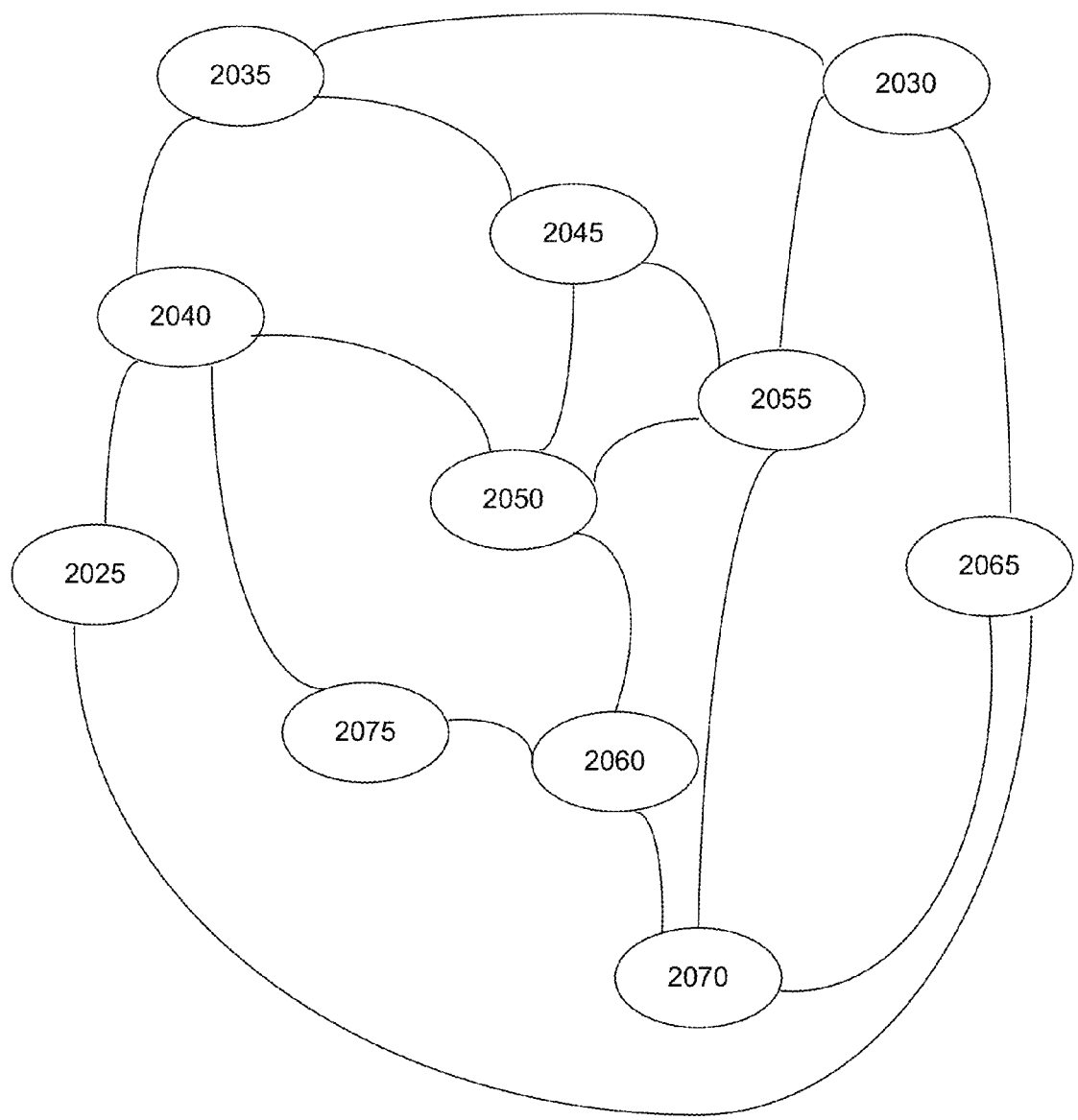
FIG. 26 illustrates a cell adjacency diagram.
Figure 27:
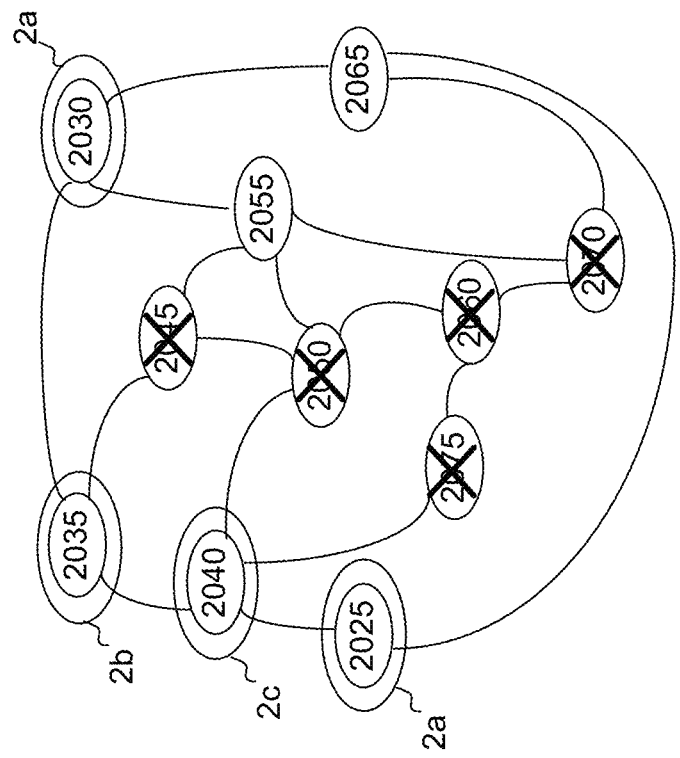
FIG. 27 illustrates cells to be discarded based on the cell classification.

Referring to FIG. 26, an adjacency graph for all of the cells shows which cells are adjacent, e.g., are coincident on a surface, rather than merely at a single point. The cell designations and adjacency graph are then used to determine which cells are to be kept for joining and which are to be discarded. Referring to FIG. 27, all cells that are in the following cell classifications are always discarded (this is rule 1 and is shown by X-ed out cells):

(a) offset body cell (cell 2070),
(b) intersection of the tool body and offset body cell (cells 2045 and 2060)
(c) the intersection of the tool body, base body and offset body cell (cell 2050) and
(d) the internal tool body cell (cell 2075).

Figure 28:
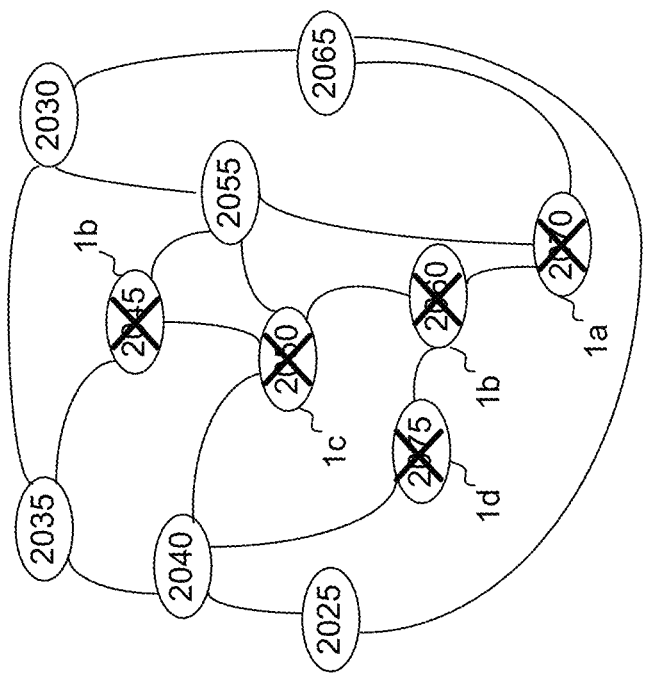
FIG. 28 illustrates cells to be kept based on the cell classification.

Referring to FIG. 28, all cells that are in the following cell classifications are always kept (this is rule 2 and as shown by a circle around the cell):

(a) base body cell (cells 2025 and 2030),
(b) external tool body cell (cell 2035), and
(c) intersection of tool body and base body cell (cell 2040).

Figure 30:
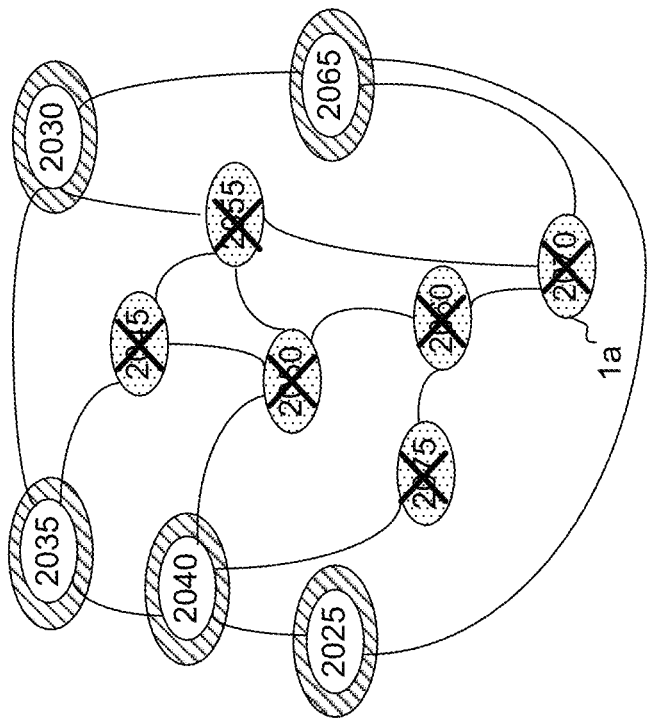
FIG. 30 illustrates cells to be retained based on the adjacency diagram.
Figure 29:
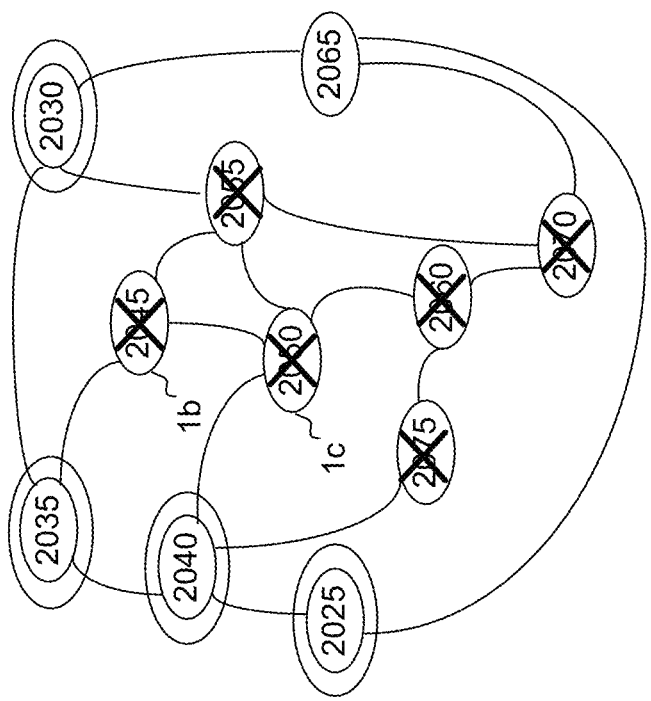
FIG. 29 illustrates cells to be discarded based on the adjacency diagram.
Figure 31:
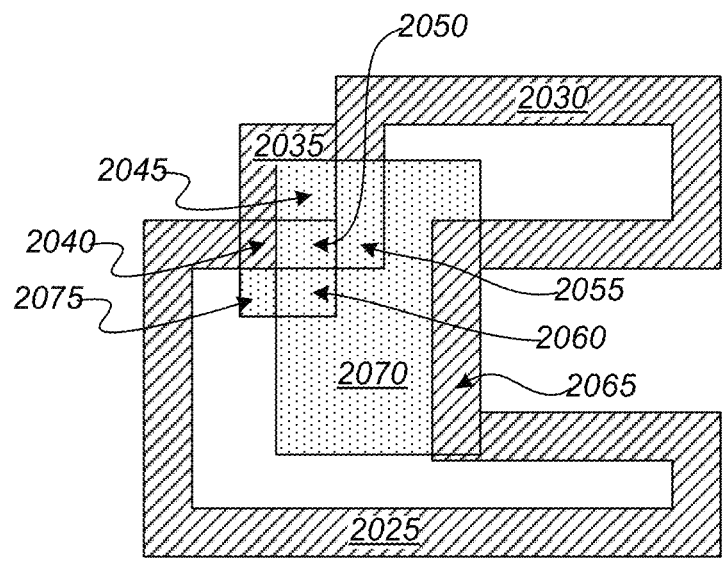
FIG. 31 illustrates the cells to be discarded and kept on a cell diagram.
Figure 32:
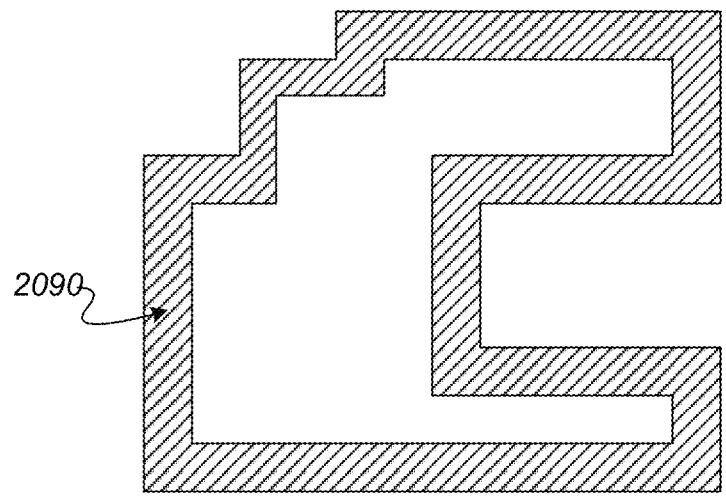
FIG. 32 illustrates a joined shelled object.

For the remaining cells, or cells that are in the category of intersection of the offset body and the base body cell, the adjacency graph is used to determine whether the cells are kept or discarded. Any cells that are adjacent to cells discarded under rules 1*b* or 1*c* able are discarded (cell 2055), as shown in FIG. 29. Referring to FIG. 30, if the cell is only adjacent to cells that are kept under rule 2 and to the offset body itself (or rule 1*a*), this cell is kept (cell 2065). A cell diagram corresponding to the adjacency graph that indicates which cells are kept and which are discarded is shown in FIG. 31. The kept cells are joined to form the shelled product.

Figure 33:
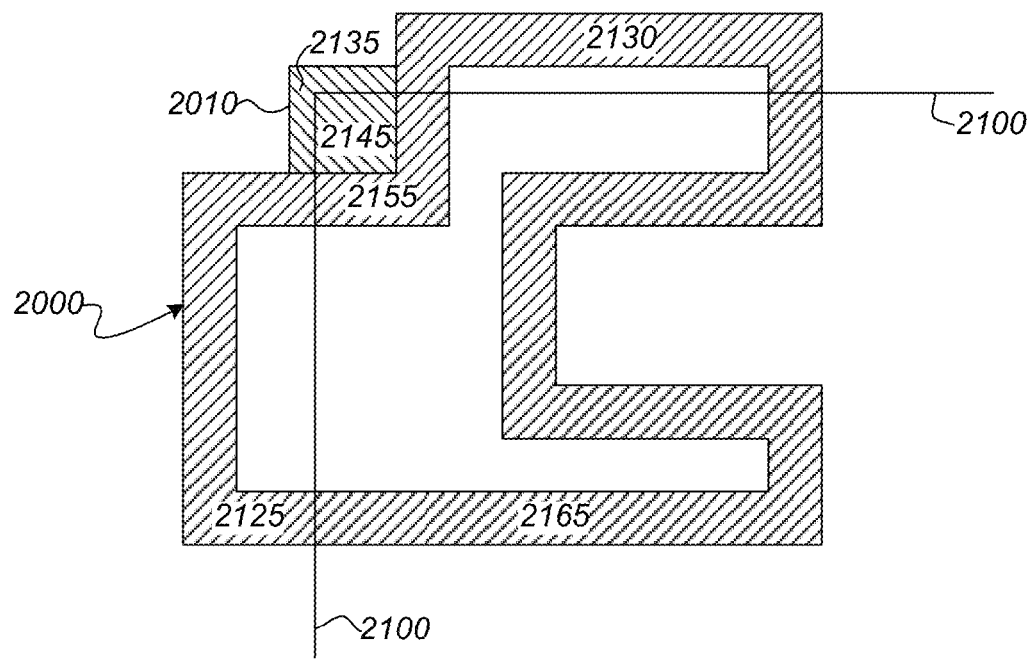
FIG. 33 illustrates the extension method of adding a shelled tool body.

A similar use of the adjacency graph can be used with the extension method, described above. However, the rules would be as follows. Steps 1 and 2 would still use the cell classification. Step 3 would use the adjacency graph to determine which cells to keep that are not addressed by the cell classification. Referring to FIG. 33, new surfaces are extended over the base body 2000 and offset to form lines 2100. The regions defined by the tool body 2010 and, base body 2000 and lines 2100 are divided into non-bounded base body cells 2125, 2130, i.e., cells that are part of the base body and external to a region bounded by the lines 2100, a non-intersecting tool body cell 2135, i.e., a part of the tool body cells that is external to lines 2100, an intersecting tool body cell 1245, i.e., a region of the tool body that is bounded by the lines 2100, and an intersecting base body cells 2155, 2165, i.e., parts of the base body that are within the regions bounded by lines 2100.

Figure 34:
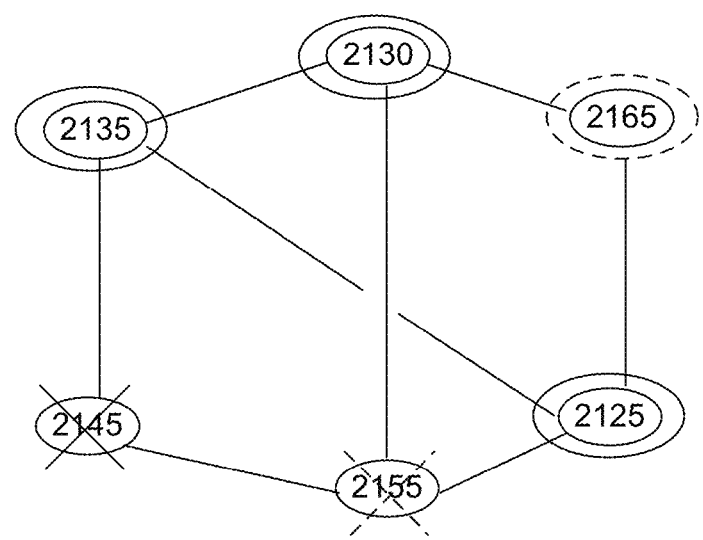
FIG. 34 shows the use of an adjacency graph for the addition.

Referring to FIG. 34, the cells that are intersecting tool body cells are discarded (rule 1), here cell 2145. The cells that are non-bounded base body cells are kept (rule 2*a*) and non-intersecting tool body cells (rule 2*b*), here cells 2130, 2125 and 2135. The cells that are left are the intersecting base body cells. Any cells that are adjacent to a cell discarded under rule 1 is discarded. Any cells on the adjacency graph that are only adjacent to cells that are kept under rule 2 are also kept.

Figure 35:
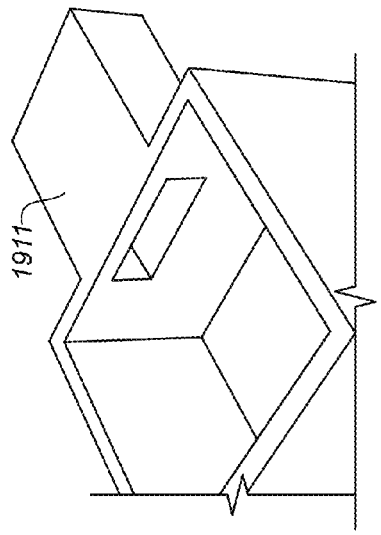
FIGS. 35-37 show shelled bodies with different options selected.

In some implementations, a user is provided with options for forming the shelled tool body or base body. Referring to FIG. 35, the wall thicknesses 1905, 1907 can be selected. The desired wall thickness is equal to the amount of offset for each surface. Each wall can have the same or different thickness from other walls of the tool body or of the base body. For example, by default all of the faces of the tool body can be offset by the value of the shell thickness at the base body. However, one face can be selected to have a greater thickness 1907 from another face 1905. In the technique that offsets the entirety of the tool body shape, the direction of offset along both an x, a y or a z axis is determined by the desired thickness of the shell along the corresponding axis or axes. Thus, the tool body can be offset in a greater direction along the one axis than another. In the technique that offsets the surfaces, each surface is independently offset according to the desired shell thickness.

Figure 36:
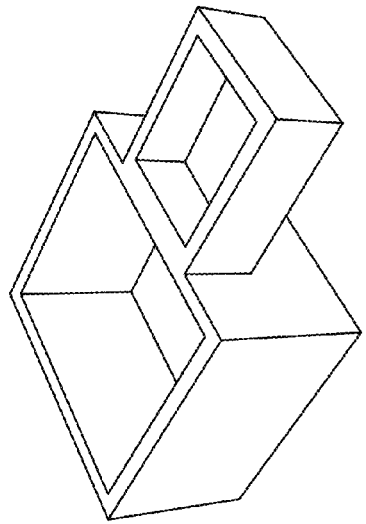
Figure 37:
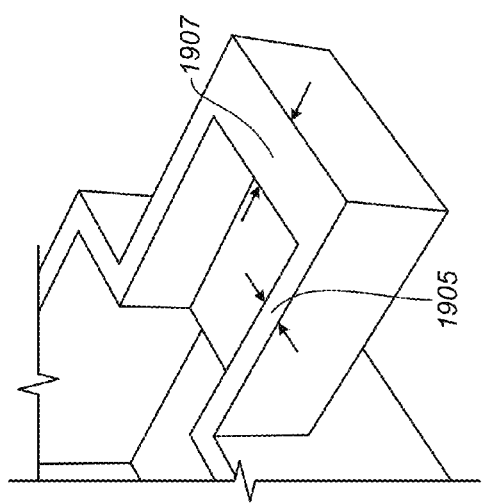

Referring to FIG. 36, certain faces can be left open or closed. In some implementations, curves can be selected from a profile and the faces 1911 arising out of the selected curves will be shelled. Therefore, a face that is a non-open face is not shelled (FIG. 34) and a face that is an open face is shelled, as shown in FIG. 37. Note that the cross section along a not open face can appear in as the tool body added onto the base body without shelling, assuming that the tool body is planar with the cross section and has a flat surface. Thus, this cross section would look like any of the first figures in FIGS. 16, 18 and 20. A cross section below the not open face can appear as a shelled tool body. Thus, this cross section would look like the third and final figures in FIGS. 16, 18 and 20. FIG. 37 shows the same base body and tool body as in FIG. 36, but the top face 1911 of the tool body is shelled. The bottom surface of the tool body 1923 is not an open face and is not shelled. Thus, the system can allow for selecting different options for each of the different faces of the tool body.

Figure 38:
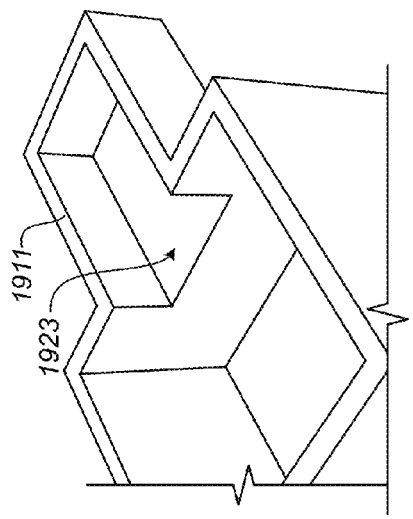
FIG. 38 shows a resultant object from using a conventional method for adding a tool body onto a shelled object.

Referring to FIG. 38, in some implementations, the user can select whether the tool body is joined to the base body. The join option specifies how the faces of the tool body and the base body that are common or adjacent to one another are handled during the join. The techniques described herein assume that a shelled interior of the tool body is fluidly connected to a shelled interior of the base body. However, the faces common to the tool body and shell body can be left in place if desired. This is similar to shelling the tool body prior to adding it to a shelled base body.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. A tool body can be added onto a base body to create a new base body. One or more tool bodies can then be added onto the new base body. A surface that is not coincident to a base body can share an edge with the base body. In certain implementations, multitasking and parallel processing may be advantageous.

We claim:

1. A computer implemented method of forming a representation of a shelled object, comprising:
   receiving a tool body to be added onto a base body;
   determining one or more surfaces of the tool body that are not shared with the base body;
   creating a form with offset features, wherein the creating step includes either offsetting the tool body away from the surfaces that are not shared with the base body and toward the base body or offsetting the surfaces of the tool body that are not shared with the base body toward the base body;
   dividing the form with offset features into a plurality of cells including one or more cells that are bounded by the one or more surfaces of the tool body that are not shared with the base body prior to offset, the one or more surfaces of the tool body that are not shared with the base body after offset and one or more surfaces of the base body, one or more cells that are bounded by the one or more surfaces of the tool body after offset and one or more surfaces of the base body, one or more cells that are defined by a portion of the base body that is not overlapped by the tool body after offset or one or more cells that are defined by a portion of the base body that is overlapped by the tool body after offset; and
   joining a subset of cells from the plurality of cells to form an assembly, wherein a representation of the assembly is shown on a display of a graphical computing device.

2. The method of claim 1, wherein determining includes classifying the surfaces of the tool body as surfaces that are shared with the base body and surfaces that are not shared with the base body.

3. The method of claim 1, wherein the base body is a 3-dimensional structure and the method further comprises determining that after the joining step, one or more faces of the tool body include an aperture and one or more faces of the tool body are solid.

4. The method of claim 1, wherein the base body includes a first aperture and joining the subset of cells forms a second aperture in the tool body that is fluidly connected to the first aperture in the base body.

5. The method of claim 1, further comprising removing a subset of cells that are not used to form the assembly.

6. The method of claim 1, wherein creating a form with offset features includes offsetting the tool body away from the surfaces that are not shared with the base body and toward surfaces shared with the base body.

7. The method of claim 6, wherein dividing the form into a plurality of cells includes:
- forming a first cell class including a cell that is bounded by the one or more surfaces of the tool body that are not shared with the base body prior to offset, the one or more surfaces of the tool body that are not shared with the base body after offset and one or more surfaces of the base body;
- forming a second cell class including a cell that is bounded by the one or more surfaces of the tool body after offset and one or more surfaces of the base body;
- forming a third cell class including a cell that is defined by a portion of the base body that is not overlapped by the tool body after offset; and
- forming a fourth cell class including a cell that is defined by a portion of the base body that is overlapped by the tool body after offset.

8. The method of claim 7, wherein joining the subset of cells includes joining the first cell class and the third cell class.

9. The method of claim 7, wherein joining the subset of cells comprises:
- creating an adjacency graph showing which cells are adjacent to one another; and
- determining a subset of cells of the fourth cell class to keep based on the adjacency graph.

10. The method of claim 7, further comprising discarding the second cell and the fourth cell.

11. The method of claim 6, wherein offsetting the tool body includes offsetting the shared surfaces of tool body a distance equal to a desired thickness of a wall of the assembly in the region of the tool body.

12. The method of claim 11, wherein the tool body is offset a greater amount along an x-axis than along a y-axis.

13. The method of claim 6, wherein offsetting the tool body includes offsetting surfaces that are shared with the base body a greater amount than the surfaces that are not shared with the base body and extending the surfaces to form a solid form.

14. The method of claim 1, wherein creating a form with offset features offsetting the surfaces of tool body that are not shared with the base body toward the base body.

15. The method of claim 14, wherein offsetting the surfaces includes extending the surfaces, the offsetting and extending forming one or more extended offset surfaces.

16. The method of claim 15, wherein dividing the form into a plurality of cells includes:
- forming a first cell class including a cell that is bounded by the one or more surfaces of the tool body that are not shared with the base body prior to offset, the one or more extended offset surfaces and one or more surfaces of the base body;
- forming a second cell class including a cell that is bounded by the one or more extended offset surfaces and one or more surfaces of the base body;
- forming a third cell class including a cell that is defined by a portion of the base body that is not bounded by the one or more extended offset surfaces; and
- forming a fourth cell class including a cell that is defined by a portion of the base body that is bounded by the one or more extended offset surfaces.

17. The method of claim 16, wherein joining the subset of cells includes joining the first cell and the third cell.

18. The method of claim 16, wherein joining the subset of cells comprises:
- creating an adjacency graph showing which cells are adjacent to one another; and
- determining a subset of cells of the fourth cell class to keep based on the adjacency graph.

19. The method of claim 16, wherein dividing the form into a plurality of cells includes forming a fifth cell that is defined by a portion of the base body that is bounded by the one or more extended offset surfaces, but only if there is a gap between the portion and a portion of the base body that is bounded by the one or more extended offset surfaces and that is in direct contact with one of the one or more extended offset surfaces.

20. A non-transitory computer program product, tangibly stored on a computer-readable medium, the product comprising instructions operable to cause a programmable processor to perform operations comprising:
- receive a tool body to be added onto a base body;
- determine one or more surfaces of the tool body that are not shared with the base body;
- create a form with offset features, wherein the creating step includes either offsetting the tool body away from the surfaces that are not shared with the base body and toward the base body or offsetting the surfaces of the tool body that are not shared with the base body toward the base body;
- divide the form with offset features into a plurality of cells including one or more cells that are bounded by the one or more surfaces of the tool body that are not shared with the base body prior to offset, the one or more surfaces of the tool body that are not shared with the base body after offset and one or more surfaces of the base body, one or more cells that are bounded by the one or more surfaces of the tool body after offset and one or more surfaces of the base body, one or more cells that are defined by a portion of the base body that is not overlapped by the tool body after offset or one or more cells that are defined by a portion of the base body that is overlapped by the tool body after offset; and
- join a subset of cells from the plurality of cells to form an assembly, wherein a representation of the assembly is shown on a display of a graphical computing device.

21. A computing system comprising:
- a computer readable medium including a program product; and
- one or more processors operable to interact with the computer readable medium and execute the program product to perform operations comprising:
- receiving a tool body to be added onto a base body;
- determining one or more surfaces of the tool body that are not shared with the base body;
- creating a form with offset features, wherein the creating step includes either offsetting the tool body away from the surfaces that are not shared with the base body and toward the base body or offsetting the surfaces of the tool body that are not shared with the base body toward the base body;
- dividing the form with offset features into a plurality of cells including one or more cells that are bounded by the one or more surfaces of the tool body that are not shared with the base body prior to offset, the one or more surfaces of the tool body that are not shared with the base body after offset and one or more surfaces of the base body, one or more cells that are bounded by the one or more surfaces of the tool body after offset and one or more surfaces of the base body, one or more cells that are defined by a portion of the base body that is not overlapped by the tool body after offset or one or more cells that are defined by a portion of the base body that is overlapped by the tool body after offset; and joining a subset of cells from the plurality of cells to form an assembly, wherein a representation of the assembly is shown on a display of a graphical computing device.

\* \* \* \* \*